US012468326B2

(12) United States Patent
Haruyama et al.

(10) Patent No.: US 12,468,326 B2
(45) Date of Patent: Nov. 11, 2025

(54) VOLTAGE REGULATOR

(71) Applicant: ABLIC Inc., Nagano (JP)

(72) Inventors: Atsushi Haruyama, Nagano (JP); Yasuhiko Ogura, Nagano (JP); Teruo Suzuki, Nagano (JP)

(73) Assignee: ABLIC INC., Nagano (JP)

( * ) Notice: Subject to any disclaimer, the term of this patent is extended or adjusted under 35 U.S.C. 154(b) by 319 days.

(21) Appl. No.: 18/464,522

(22) Filed: Sep. 11, 2023

(65) Prior Publication Data

US 2024/0111320 A1 Apr. 4, 2024

(30) Foreign Application Priority Data

Sep. 29, 2022 (JP) ................................. 2022-156544

(51) Int. Cl.
*G05F 1/565* (2006.01)
*G05F 1/56* (2006.01)
*G05F 1/575* (2006.01)

(52) U.S. Cl.
CPC ................ *G05F 1/565* (2013.01); *G05F 1/56* (2013.01); *G05F 1/575* (2013.01)

(58) Field of Classification Search
CPC ............. G05F 1/56; G05F 1/565; G05F 1/575
See application file for complete search history.

(56) References Cited

U.S. PATENT DOCUMENTS 10,831,219 B2 * 11/2020 Tomioka .............. H02H 1/0007
2008/0265852 A1 * 10/2008 Imura ..................... G05F 1/575 323/277
2010/0207591 A1 * 8/2010 Imura ..................... G05F 1/565 323/265
2016/0349776 A1 * 12/2016 Conte ..................... G05F 1/575
2020/0278710 A1 9/2020 Sankman et al.

* cited by examiner

*Primary Examiner* — Monica Lewis
*Assistant Examiner* — Lakaisha Jackson
(74) *Attorney, Agent, or Firm* — Chrisman Gallo Tochtrop LLC

(57) ABSTRACT

Provided is a voltage regulator capable of suppressing a current consumption in a non-regulation state with a simple circuit configuration. The voltage regulator includes an output transistor supplying an output voltage based on a control voltage, an error amplifier circuit supplying an amplified signal obtained by amplifying a difference between a voltage based on the output voltage and a reference voltage, a common source amplifier circuit supplying the control voltage to the output transistor based on the amplified signal, and a non-regulation state detection circuit supplying a detection signal to the common source amplifier circuit. The common source amplifier circuit includes a current control circuit including a plurality of parallel paths connecting between a control terminal of the output transistor and a power supply terminal, the plurality of parallel paths including a path to be closed in the non-regulation state and a path to be opened in the non-regulation state.

12 Claims, 5 Drawing Sheets

VOLTAGE REGULATOR

CROSS-REFERENCE TO RELATED APPLICATION

This application claims the priority benefits of Japanese patent application no. 2022-156544, filed on Sep. 29, 2022. The entirety of the above-mentioned patent application is hereby incorporated by reference herein and made a part of this specification.

BACKGROUND OF THE INVENTION

1. Field of the Invention

The present invention relates to a voltage regulator.

2. Description of the Related Art

A low dropout regulator (hereinafter referred to as "LDO") serving as an example of a voltage regulator is a direct-current (DC) linear voltage regulator for adjusting an output voltage VOUT based on a power supply voltage VDD. In a case in which the power supply voltage VDD is higher than a reference voltage VREF determined based on the output voltage VOUT (hereinafter referred to as "regulation state"), the LDO generates the output voltage VOUT by regulating the power supply voltage VDD. Meanwhile, in a case in which the power supply voltage VDD is lower than the reference voltage VREF (hereinafter referred to as "non-regulation state"), a current consumption of the LDO may significantly increase compared to the case in the regulation state. This increase in current consumption may be on the order of tens, hundreds, or thousands of times in some cases.

As a countermeasure against the increase in current consumption in the non-regulation state, there is disclosed an LDO including a minimum dropout voltage circuit (see, for example, US 2020/0278710). The minimum dropout voltage circuit prevents the LDO from being in the non-regulation state by operating in such a manner that the reference voltage VREF maintains a value obtained by subtracting a minimum dropout voltage VMIN from the power supply voltage VDD (see, for example, US 2020/0278710).

However, the related-art voltage regulator as disclosed in US 2020/0278710 has a huge circuit scale and is complicated.

SUMMARY OF THE INVENTION

The present invention has been made in view of the above-mentioned circumstances, and has an object to provide a voltage regulator capable of suppressing a current consumption in a non-regulation state with a simple circuit configuration.

According to at least one aspect of the present application, there is provided a voltage regulator including: an output transistor including a control terminal, and being configured to receive a control voltage from the control terminal and supply an output voltage; an error amplifier circuit configured to supply an amplified signal obtained by amplifying a difference between a voltage based on the output voltage and a reference voltage; a common source amplifier circuit configured to receive the amplified signal, and to supply the control voltage to the control terminal; and a non-regulation state detection circuit configured to supply a detection signal including a signal level corresponding to one of a regulation state or a non-regulation state to the common source amplifier circuit, the common source amplifier circuit including a current control circuit including a plurality of parallel paths each connecting between the control terminal of the output transistor and a first power supply terminal for supplying a first power supply voltage, the parallel paths including a first path to be a closed state in the non-regulation state and a second path to be an opened state in the non-regulation state.

According to the voltage regulator, it is possible to suppress the current consumption in the non-regulation state with a simple circuit configuration.

DESCRIPTION OF THE EMBODIMENTS

Now, a voltage regulator according to embodiments of the present invention is described with reference to the accompanying drawings.

First Embodiment

Figure 1:
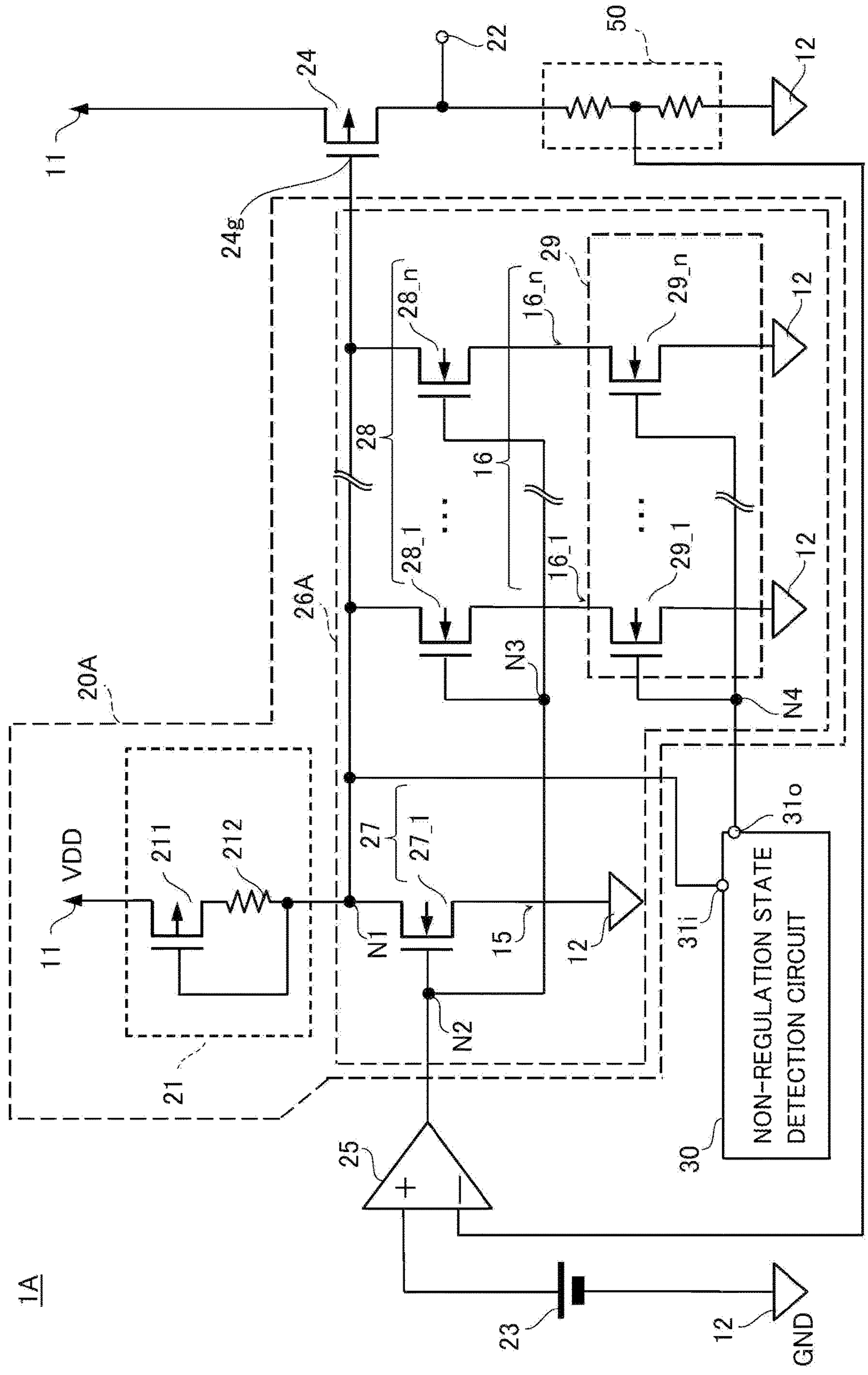
FIG. 1 is a circuit diagram for illustrating a configuration of a voltage regulator according to a first embodiment of the present invention.

FIG. 1 is a circuit diagram for illustrating a configuration of a voltage regulator LA serving as an example of a voltage regulator according to a first embodiment of the present invention.

The voltage regulator LA includes a common source amplifier circuit 20A, an error amplifier circuit 25, a PMOS transistor 24 serving as an example of a P-type field effect transistor, and a non-regulation state detection circuit 30. The voltage regulator 1A further includes a voltage dividing circuit 50 which supplies a voltage (divided voltage) obtained by dividing a voltage of an output terminal 22 of the voltage regulator 1A, that is, an output voltage of the voltage regulator 1A, with respect to a voltage (hereinafter referred to as "power supply voltage GND") of a ground terminal (hereinafter referred to as "GND terminal") 12 serving as a first power supply terminal.

The common source amplifier circuit 20A includes a current-voltage conversion circuit (hereinafter referred to as "I/V conversion circuit") 21 and a current control circuit 26A. The error amplifier circuit 25 includes a non-inverting input terminal (+) connected to an output terminal of a reference voltage circuit 23, an inverting input terminal (−) connected to an output terminal of the voltage dividing circuit 50, and an output terminal. The PMOS transistor 24 serving as an output transistor includes a source connected to a VDD terminal 11 serving as a second power supply terminal, a drain connected to the output terminal 22, and a gate 24*g* serving as a control terminal connected to the current control circuit 26A.

The I/V conversion circuit 21 includes, for example, a resistive element including a PMOS transistor 211 and a resistor 212. The I/V conversion circuit 21 has a first port connected to the VDD terminal 11 for supplying a power supply voltage VDD serving as a second power supply voltage and a second port connected to the current control circuit 26A. The resistive element exemplified in FIG. 1 is configured in such a manner that a drain of the PMOS transistor 211 is connected to a first end of the resistor 212 and a gate of the PMOS transistor 211 is connected to a second end of the resistor 212. A first end of the resistive element is a source of the PMOS transistor 211 and is the first port of the I/V conversion circuit 21. A second end of the resistive element is the gate of the PMOS transistor 211 and the second end of the resistor 212, and is the second port of the I/V conversion circuit 21.

The current control circuit 26A has a plurality of parallel paths 15 and 16 (16_1, . . . , and 16_*n*) ("n" is a natural number) connecting between the gate 24*g* and the GND terminal 12. In this case, the path 15 serving as a first path is at least one path including a current control transistor 27 and maintaining a conductive state in which a current flows with the voltage regulator LA being in a non-regulation state. The current control transistor 27 includes, for example, an NMOS transistor 27_1 which is an example of an N-type field effect transistor.

The paths 16 each serving as a second path are paths connecting between the gate 24*g* and the GND terminal 12 in a switchable manner to any one of an opened state or a closed state, and include the "n" parallel paths 16_1, . . . , and 16_*n*. The paths 16_1, . . . , and 16_*n* include NMOS transistors 28_1, . . . , and 28_*n* serving as current control transistors 28, and NMOS transistors 29_1, . . . , and 29_*n* serving as pass transistors 29, respectively, and are "n" paths to be in the opened state in a case in which the voltage regulator LA is in the non-regulation state. That is, the current control circuit 26A includes the NMOS transistor 27_1 provided in the path 15 and the NMOS transistors 28_1, . . . , and 28_*n* and the NMOS transistors 29_1, . . . , and 29_*n* provided in the paths 16.

The NMOS transistor 27_1 and the NMOS transistors 28_1, . . . , and 28_*n* are connected in parallel to each other between the gate 24*g* and the GND terminal 12. The current control transistor 27 is directly connected to the GND terminal 12 without being interposed by the NMOS transistors 29_1, . . . , and 29_*n*. Meanwhile, the NMOS transistors 28_1, . . . , and 28_*n* are connected to the GND terminal 12 via the NMOS transistors 29_1, . . . , and 29_*n*, respectively.

In other words, the NMOS transistor 27_1 and the NMOS transistors 28_1, . . . , and 28_*n* each include a drain serving as a first terminal which is connected to the gate 24*g*, a gate serving as a control terminal for receiving an amplified signal supplied from the output terminal of the error amplifier circuit 25, and a source serving as a second terminal. The NMOS transistors 29_1, and 29_*n* each include a drain serving as a first terminal connected to the source of one of the NMOS transistors 28_1, . . . , and 28_*n*, a gate serving as a control terminal for receiving a detection signal supplied from the non-regulation state detection circuit 30, and a source serving as a second terminal connected to the GND terminal 12 for supplying the power supply voltage GND serving as a first power supply voltage.

The non-regulation state detection circuit 30 includes an input terminal 31*i* connected to a node N1 and an output terminal 31*o* connected to each control terminal of the NMOS transistors 29_1, . . . , and 29_*n*. In this case, the node N1 is a connection point among the second port of the I/V conversion circuit 21, each of the drains of the NMOS transistor 27_1 and the NMOS transistors 28_1, . . . , and 28_*n*, and the gate 24*g* serving as the control terminal of the output transistor. A node N2 is a connection point between the output terminal of the error amplifier circuit 25 and the gate of the NMOS transistor 27_1. A node N3 is a connection point between the output terminal of the error amplifier circuit 25 and each of the gates of the NMOS transistors 28_1, . . . , and 28_*n*. A node N4 is a connection point between the output terminal 31*o* of the non-regulation state detection circuit 30 and each of the gates of the NMOS transistors 29_1, . . . , and 29_*n*.

Figure 2:
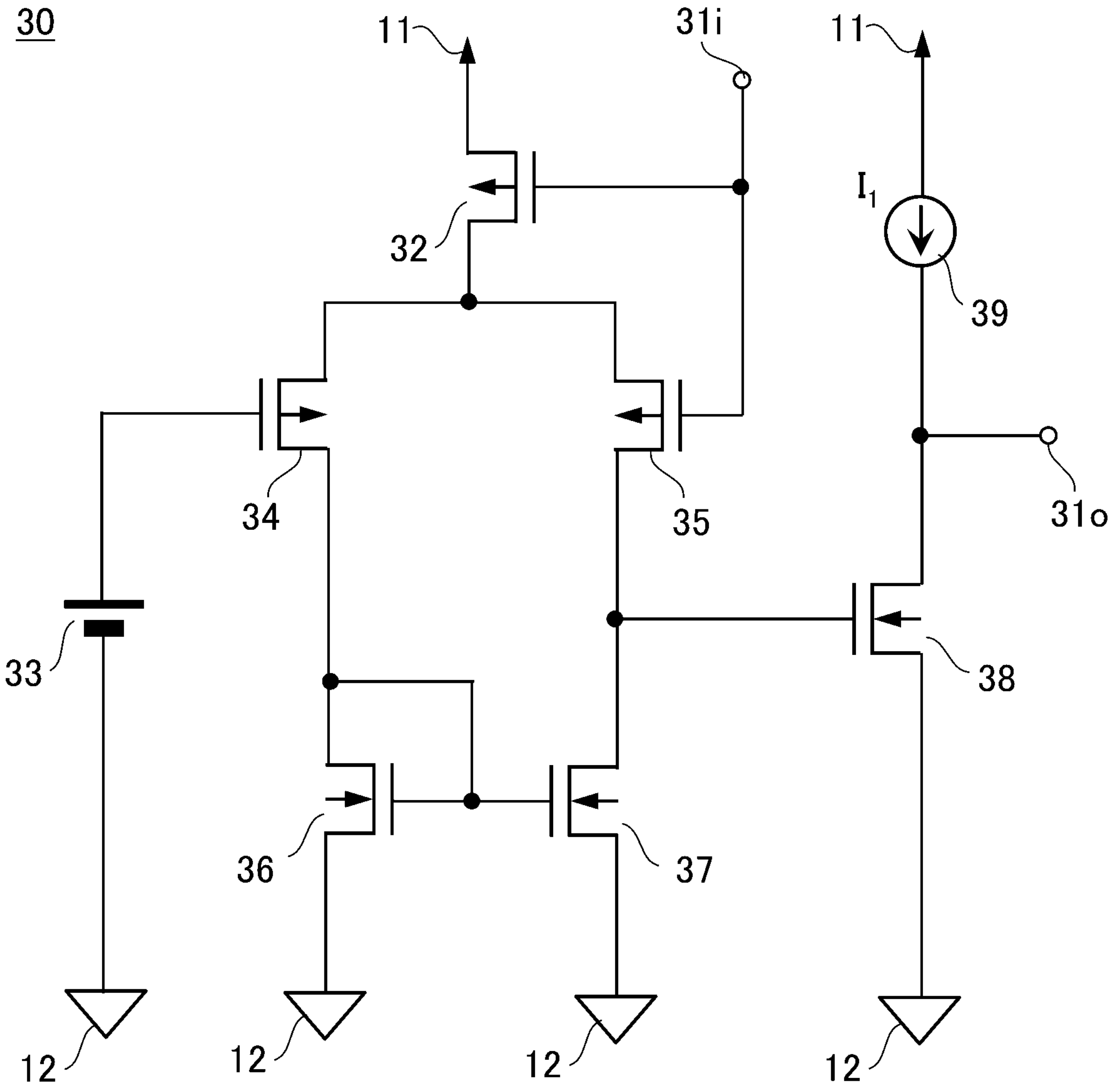
FIG. 2 is a circuit diagram for illustrating an example of a non-regulation state detection circuit included in the voltage regulator according to at least one embodiment of the present invention.

FIG. 2 is a circuit diagram for illustrating the non-regulation state detection circuit 30 serving as an example of the non-regulation state detection circuit included in the voltage regulator according to the first embodiment.

The non-regulation state detection circuit 30 includes the VDD terminal 11, the GND terminal 12, the input terminal 31*i*, the output terminal 31*o*, PMOS transistors 32, 34, and 35, NMOS transistors 36, 37, and 38, and a constant current source 39 for supplying a constant current Il. The PMOS transistors 32, 34, and 35 and the NMOS transistors 36 and 37 form a differential amplifier circuit. The NMOS transistor 38 and the constant current source 39 form an output inverter.

The differential amplifier circuit includes the PMOS transistor 32 serving as a sense transistor, the PMOS transistors 34 and 35 forming a differential pair, the NMOS transistors 36 and 37 forming a current mirror circuit being an active load circuit. A predetermined reference voltage is applied from a reference voltage circuit 33 to a gate of the PMOS transistor 34 being a first input end of the differential pair. A gate of the PMOS transistor 35 being a second input end of the differential pair is connected to the input terminal 31*i* and a gate of the PMOS transistor 32. An output end of the differential amplifier circuit is a connection point between a drain of the PMOS transistor 35 and a drain of the NMOS transistor 37.

The NMOS transistor 38 includes a drain connected to the output terminal 31*o* and being an output end of the output inverter, a gate being an input end of the output inverter and connected to the output end of the differential amplifier circuit, and a source connected to the GND terminal 12. The constant current source 39 includes a first end connected to the VDD terminal 11 and a second end connected to the drain of the NMOS transistor 38 and the output terminal 31*o*.

Next, an operation of the voltage regulator LA serving as the voltage regulator according to the first embodiment is described.

In a case in which the power supply voltage VDD is supplied to the VDD terminal 11, the voltage regulator LA supplies an output voltage to the output terminal 22. The error amplifier circuit 25 receives the reference voltage from the reference voltage circuit 23 by the non-inverting input terminal (+), and receives, by the inverting input terminal (−), the divided voltage as a voltage based on the output voltage. The error amplifier circuit 25 supplies an amplified signal obtained by amplifying a difference between the reference voltage and the divided voltage to the gates of the NMOS transistor 27_1 and the NMOS transistors 28_1, and 28_*n* serving as the control terminals of the current control transistors 27 and 28, respectively. The NMOS transistor 27_1 and the NMOS transistors 28_1, . . . , and 28_*n* convert the voltages received by the gates into drain currents, and supply the converted currents to the I/V conversion circuit 21. The I/V conversion circuit 21 converts the supplied currents into a voltage based on the power supply voltage VDD, and supplies the converted voltage to the gate 24*g* of the PMOS transistor 24. The error amplifier circuit 25 and the common source amplifier circuit 20A control a voltage of the gate 24*g* so that the output voltage approaches the reference voltage supplied to the non-inverting input terminal (+).

The non-regulation state detection circuit 30 detects whether the voltage regulator LA is in a regulation state or not (in a non-regulation state) based on a voltage obtained by current-voltage (I/V) conversion and appearing on the second port of the I/V conversion circuit 21, that is, a voltage of the node N1. The non-regulation state detection circuit 30 supplies, as a detection result, a detection signal including a signal level corresponding to the regulation state or the non-regulation state. In a case in which the voltage regulator 1A has a sufficiently high power supply voltage VDD and the voltage regulator LA is in the regulation state, the non-regulation state detection circuit 30 exemplified in FIG. 2 supplies a detection signal in a high level (hereinafter referred to as "H level") from the output terminal 31*o*.

In a case in which the NMOS transistors 29_1, . . . , and **29_*n* receive the H-level detection signal by the gates from the output terminal 31***o*, the NMOS transistors 29_1, . . . , and **29_*n* are turned on and enter a closed state. As a result of turning on the NMOS transistors 28_1, . . . , and 28_*n*, a current is allowed to flow through each of the paths 16_1, . . . , and 16_*n* of the paths 16. Accordingly, in a case in which the voltage regulator LA is in the regulation state, a large amount of current is allowed to flow through the current control transistors as a whole, and the output voltage is controlled to be a desired voltage based on the reference voltage. At this time, the error amplifier circuit 25 and the common source amplifier circuit 20A control the voltage of the gate 24***g* of the PMOS transistor 24 so that the divided voltage of the output voltage and the reference voltage match each other.

In contrast, in a case in which the voltage regulator 1A is in the non-regulation state, the divided voltage of the output voltage is lower than the reference voltage. Thus, the error amplifier circuit 25 turns the NMOS transistor 27_1 and the NMOS transistors 28_1, . . . , and **28_*n* fully on to reduce a gate voltage of the PMOS transistor 24 to 0 V, to thereby draw a maximum support current from the VDD terminal 11. However, in the case in which the voltage regulator LA is in the non-regulation state, the power supply voltage VDD is lower than the reference voltage. Thus, no matter how much current the NMOS transistor 27_1 and the NMOS transistors 28_1, . . . , and 28_*n*** draw, the divided voltage of the output voltage cannot be matched with the reference voltage.

An operation of the NMOS transistor 27_1 and the NMOS transistors 28_1, . . . , and **28_*n* of keeping drawing the maximum support current under a state in which the divided voltage of the output voltage cannot be matched with the reference voltage cannot provide an effect worth the operation. Further, the operation of the NMOS transistor 27_1 and the NMOS transistors 28_1, . . . , and 28_*n*** of keeping drawing the maximum support current merely increases the current consumption of the voltage regulator LA, and in a case in which the voltage regulator is used in an application driven by battery, a battery consumption is increased.

Thus, in order to suppress an increase in current consumption in the non-regulation state, the voltage regulator 1A turns off the NMOS transistors 29_1, . . . , and **29_*n* in the non-regulation state. In a case in which the NMOS transistors 29_1, . . . , and 29_*n* are turned off, the paths 16_1, . . . , and 16_*n* are switched to the opened state. The non-regulation state is detected by the non-regulation state detection circuit 30 detecting that the voltage of the node N1 is lower than the predetermined voltage. In a case in which the power supply voltage VDD is not sufficiently high, and the voltage regulator 1A is in the non-regulation state, the non-regulation state detection circuit 30 exemplified in FIG. 2 supplies a detection signal in a low level (hereinafter referred to as "L level") from the output terminal 31***o*. In a case in which the NMOS transistors 29_1, . . . , and **29_*n* receive the detection signal in the L level, the NMOS transistors 29_1, . . . , and 29_*n* are turned off, and the paths 16_1, . . . , and 16_*n*** are switched to the opened state.

As described above, the voltage regulator 1A includes the common source amplifier circuit 20A provided with the paths 16 switchable to the opened state in the non-regulation state. With the voltage regulator LA including the common source amplifier circuit 20A, in a case in which the voltage regulator 1A is in the non-regulation state, the NMOS transistors 29_1, . . . , and **29_*n* can be tuned off to interrupt the current flowing through the paths 16_1, . . . , and 16_*n*. In this manner, while leaving the path 15 as at least one path maintaining the conductive state, the voltage regulator LA can switch, in the non-regulation state, the remaining at least one of the paths 16_1, . . . , and 16_*n* to the opened state. Accordingly, the voltage regulator LA can suppress the current consumed in the common source amplifier circuit 20**A in the non-regulation state with a simple circuit configuration.

Second Embodiment

Figure 3:
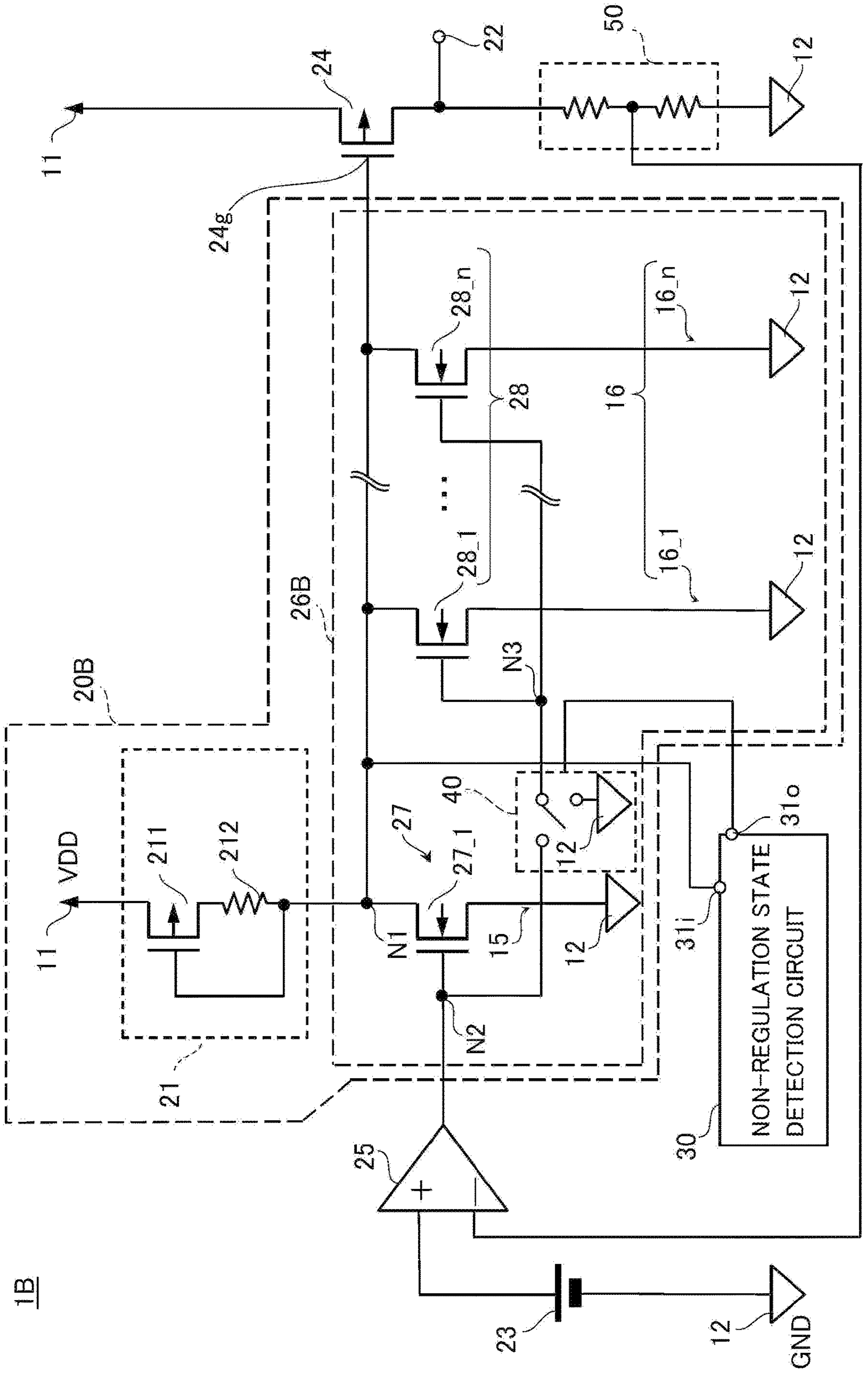
FIG. 3 is a circuit diagram for illustrating a configuration of a voltage regulator according to a second embodiment of the present invention.

FIG. 3 is a circuit diagram for illustrating a configuration of a voltage regulator 1B serving as an example of a voltage regulator according to a second embodiment of the present invention.

The voltage regulator 1B is different from the voltage regulator 1A in that the voltage regulator 1B includes a common source amplifier circuit 20B instead of the common source amplifier circuit 20A, but other components are not substantially different from those of the voltage regulator LA. Thus, in the following description of the second embodiment, the differences from the voltage regulator 1A are mainly described, substantially the same components as those of the voltage regulator LA are denoted by the same reference symbols, and overlapping descriptions thereof are omitted.

The voltage regulator 1B includes the common source amplifier circuit 20B, the error amplifier circuit 25, the PMOS transistor 24, and the non-regulation state detection circuit 30. The common source amplifier circuit 20B includes the I/V conversion circuit 21 and a current control circuit 26B. As opposed to the current control circuit 26A, the current control circuit 26B includes, instead of the NMOS transistors 29_1, . . . , and **29_*n* serving as the pass transistors 29, a switching circuit 40 capable of opening and closing a path between the node N2 and the node N3. That is, the current control circuit 26B includes the path 15 and the "n" paths 16_1, . . . , and 16_*n* from which the NMOS transistors 29_1, . . . , and 29_*n*** are omitted.

The switching circuit 40 includes a first end connected to the node N2, a second end connected to the node N3, a third end connected to the GND terminal 12, and a control end for receiving the detection signal supplied from the output terminal 31*o*. The switching circuit 40 is configured so that a connection destination of the second end can be switched between the first end and the third end in accordance with a signal level of a signal supplied to the control end. In a case in which the voltage regulator 1B is in the regulation state, the switching circuit 40 connects the node N2 to the node N3. Meanwhile, in a case in which the voltage regulator 1B is in the non-regulation state, the switching circuit 40 disconnects the node N2 from the node N3. In the switching circuit 40 exemplified in FIG. 3 and FIG. 4 described later, in the case in which the voltage regulator 1B is in the non-regulation state, the switching circuit 40 disconnects the node N2 from the node N3, and connects (pulls down) the node N3 to the GND terminal 12.

Figure 4:
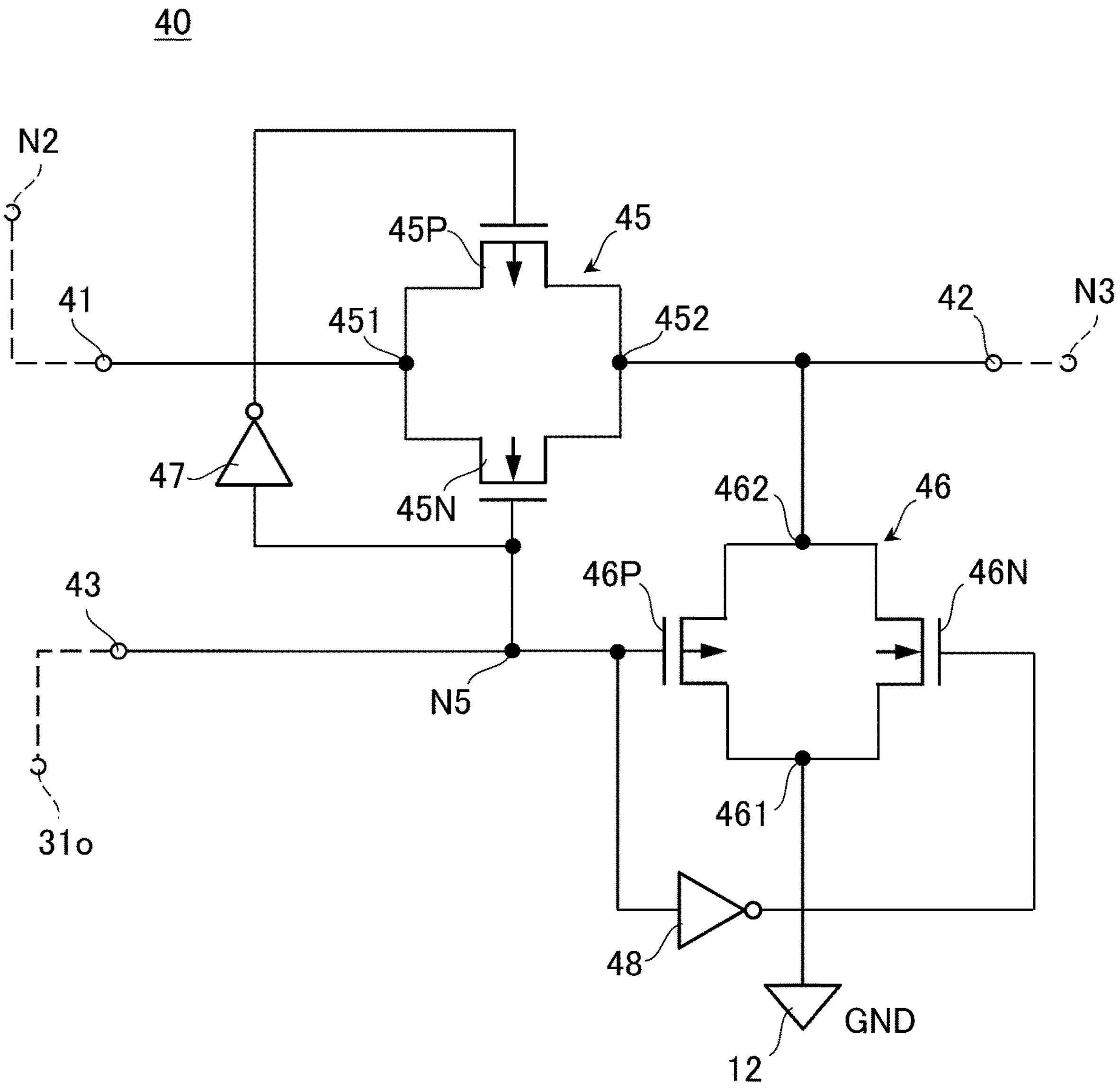
FIG. 4 is a circuit diagram for illustrating a configuration example of a switching circuit included in the voltage regulator according to the second embodiment.

FIG. 4 is a circuit diagram for illustrating a configuration example of the switching circuit 40.

The switching circuit 40 includes a first end 41, a second end 42, a control end 43, transistor pairs 45 and 46, and inverters 47 and 48. The first end 41 is connected to the node N2. The second end 42 is connected to the node N3. The control end 43 is connected to the output terminal 31*o*. The transistor pair 45 serving as a first transistor pair is a pair of a PMOS transistor 45P and an NMOS transistor 45N. The transistor pair 46 serving as a second transistor pair is a pair of a PMOS transistor 46P and an NMOS transistor 46N.

The PMOS transistor 45P and the NMOS transistor 45N have drains and sources connected to each other. A connection point 451 is a connection point between the source of the PMOS transistor 45P and the drain of the NMOS transistor 45N. The connection point 451 serving as a first end of the transistor pair 45 is connected to the first end 41 of the switching circuit 40. A connection point 452 is a connection point between the drain of the PMOS transistor 45P and the source of the NMOS transistor 45N. The connection point 452 serving as a second end of the transistor pair 45 is connected to the second end 42 of the switching circuit 40. Gates of the PMOS transistor 45P and the NMOS transistor 45N are connected to each other via the inverter 47 serving as a first inverter. In the transistor pair 45 exemplified in FIG. 4, the inverter 47 includes an input end connected to the gate of the NMOS transistor 45N and an output end connected to the gate of the PMOS transistor 45P.

The PMOS transistor 46P and the NMOS transistor 46N have drains and sources connected to each other. A connection point 461 is a connection point between the drain of the PMOS transistor 46P and the source of the NMOS transistor 46N. The connection point 461 serving as a first end of the transistor pair 46 is connected to the GND terminal 12. A connection point 462 is a connection point between the source of the PMOS transistor 46P and the drain of the NMOS transistor 46N. The connection point 462 serving as a second end of the transistor pair 46 is connected to the second end 42. Gates of the PMOS transistor 46P and the NMOS transistor 46N are connected to each other via the inverter 48 serving as a second inverter. In the transistor pair 46 exemplified in FIG. 4, the inverter 48 includes an input end connected to the gate of the PMOS transistor 46P and an output end connected to the gate of the NMOS transistor 46N.

Herein, a connection point among the input end of the inverter 47, the input end of the inverter 48, the gate of the NMOS transistor 45N, and the gate of the PMOS transistor 46P is referred to as "node N5."

Next, an operation of the voltage regulator 1B serving as the voltage regulator according to the second embodiment is described.

The voltage regulator 1B opens and closes the paths 16_1, . . . , and 16_*n* in the regulation state and the non-regulation state similarly to the case with the voltage regulator LA. In a case in which the voltage regulator 1B is in the regulation state, the switching circuit 40 switches a path between the node N2 and the node N3 to the closed state.

More specifically, the switching circuit 40 (see FIG. 4) receives, from the control end 43, the detection signal in the H level supplied from the output terminal 31*o*. In a case in which the detection signal in the H level is supplied from the control end 43, the signal in the H level is supplied to each of the gates of the NMOS transistor 45N and the PMOS transistor 46P. Further, to the gate of the PMOS transistor 45P, the signal in the L level is supplied via the inverter 47. To the gate of the NMOS transistor 46N, the signal in the L level is supplied via the inverter 48. Accordingly, in the case in which the detection signal in the H level is supplied from the control end 43, both ends of the transistor pair 45 are conducted, whereas both ends of the transistor pair 46 are opened.

In a case in which the voltage regulator 1B is in the non-regulation state, the switching circuit 40 connects the node N3 to the GND terminal 12. That is, a path between the node N2 and the node N3 is brought into the opened state, and the node N3 is pulled down at the same time.

More specifically, the switching circuit 40 (see FIG. 4) receives, from the control end 43, the detection signal in the L level supplied from the output terminal 31*o*. In a case in which the detection signal in the L level is supplied from the control end 43, the signal in the L level is supplied to each of the gates of the NMOS transistor 45N and the PMOS transistor 46P. Further, to the gate of the PMOS transistor 45P, the signal in the H level is supplied via the inverter 47. To the gate of the NMOS transistor 46N, the signal in the L level is supplied via the inverter 48. Accordingly, in the case in which the detection signal in the L level is supplied from the control end 43, both ends of the transistor pair 45 are opened, whereas both ends of the transistor pair 46 are conducted.

As described above, the voltage regulator 1B includes the common source amplifier circuit 20B provided with the paths 16 switchable to the opened state in the non-regulation state. With the voltage regulator 1B including the common source amplifier circuit 20B, in a case in which the voltage regulator 1B is in the non-regulation state, the switching circuit 40 connects the node N3 to the GND terminal 12. In response to the connection between the node N3 and the GND terminal 12, the NMOS transistors 28_1, . . . , and 28_*n* receive the power supply voltage GND with the gates to be turned off. In this manner, while leaving the path 15 as at least one path maintaining the conductive state, the voltage regulator 1B can switch, in the non-regulation state, the remaining at least one of the paths 16_1, . . . , and 16_*n* to the opened state. Accordingly, the voltage regulator 1B can suppress the current consumed in the common source amplifier circuit 20B in the non-regulation state with a simple circuit configuration.

The present invention is not limited to the above-mentioned embodiments, and can be carried out in various forms in addition to the embodiments described above in the stage of carrying out the invention, and various omissions, additions, replacements, or alterations may be made thereto without departing from the gist of the invention. For example, the voltage regulators 1A and 1B illustrated in FIG. 1 and FIG. 3 each include the voltage dividing circuit 50. However, a configuration may be employed in which the voltage dividing circuit 50 is omitted and the output terminal 22 is connected to the inverting input terminal (−) of the error amplifier circuit 25. Further, the voltage regulator LA may have a configuration in which a current control circuit 26C is provided instead of the current control circuit 26A.

Figure 5:
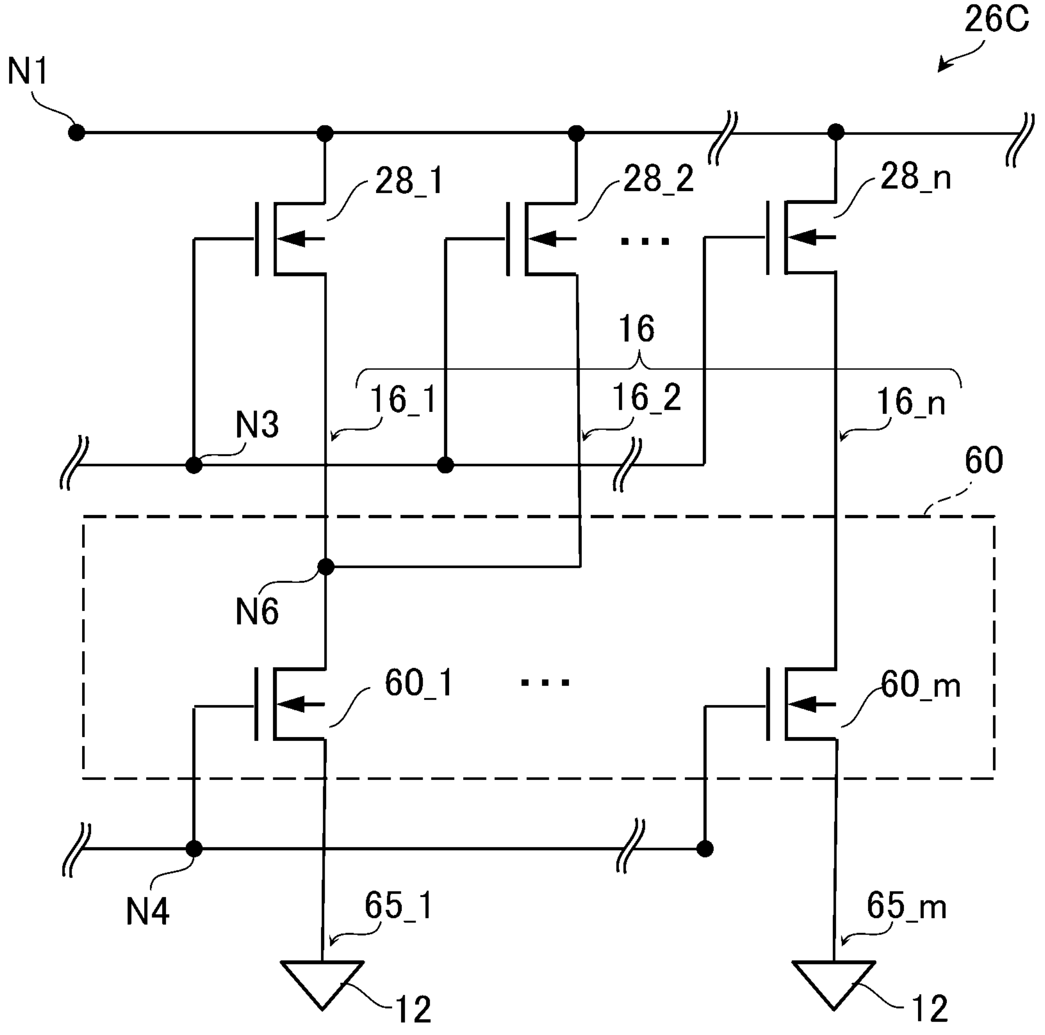
FIG. 5 is a circuit diagram for illustrating a modification example of a current control circuit included in the voltage regulator according to the first embodiment.

FIG. 5 is a circuit diagram for illustrating a configuration of the current control circuit 26C being a modification example of the current control circuit 26A.

The current control circuit 26C is different from the current control circuit 26A in that the current control circuit 26C includes pass transistors 60 instead of the pass transistors 29, but is not substantially different otherwise. The pass transistors 60 are configured such that the pass transistors 60 are aggregated to the number being one or more and smaller than "n" being the number of the NMOS transistors 28_1, . . . , and 28_*n* serving as the current control transistors 28.

The current control circuit 26C is an example in which the pass transistors 60 are aggregated to "m" ("m" is a natural number satisfying 1≤m<n) NMOS transistors 60_1, . . . , and 60_*m*, the number "m" being smaller than "n" being the number of the NMOS transistors 28_1, . . . , and 28_*n*. The current control circuit 26C includes at least one configuration in which a drain of the NMOS transistor 28_2 provided in the path 16_2 serving as a third path is connected to a node N6 being a connection point between a drain of the NMOS transistor 28_1 provided in the path 16_1 serving as the second path and a drain of the NMOS transistor 60_1. That is, in the current control circuit 26C, the paths 16 (16_1, . . . , and 16_*n*) are aggregated to "m" paths 65_1, . . . , and 65_*m* in the part of the pass transistors 60, the number "m" being the same as the number of NMOS transistors 60_1, . . . , 60_*m* forming the pass transistors 60.

Further, with the voltage regulator 1A and 1B described above, an example in which, in the regulation state, the non-regulation state detection circuit 30 supplies the detection signal in the H level from the output terminal 310 has been described, but the present invention is not limited to this example. The non-regulation state detection circuit 30 may be configured such that, in the non-regulation state, the non-regulation state detection circuit 30 supplies the detection signal in the H level from the output terminal 31*o*. In this case, by interposing an inverter on a subsequent stage of the non-regulation state detection circuit 30, the non-regulation state detection circuit 30 can be operated in the same manner as the voltage regulators 1A and 1B in a case in which the detection signal in the H level is supplied from the output terminal 31*o*.

The I/V conversion circuit 21 is not limited to the circuit illustrated in, for example, FIG. 1, and may include the resistive element. The resistive element may include at least one of the resistor, a diode element, or a transistor in which a gate and a drain are connected to each other (what is so called "diode connection"). For example, the resistive element may be formed only of the resistor 212, may be formed only of the PMOS transistor 211 in which the gate and the drain are connected to each other, or may be formed of the PMOS transistor 211 in which the gate and the drain are connected to each other and the resistor 212 connected in series to the PMOS transistor 211. Further, instead of the PMOS transistor 211 in which the gate and the drain are connected to each other, a diode element may be applied.

Each of the MOS transistors applied in the embodiments is an example of the field effect transistor (FET), and is not limited to a MOSFET. For example, a field effect transistor other than the MOSFET, such as a MIS-FET or a junction FET (JFET), may be applied.

The embodiments described above and modifications thereof are encompassed in the scope and the gist of the invention, and are encompassed in the inventions defined in claims and equivalents thereof.

What is claimed is:

1. A voltage regulator, comprising:
an output transistor including a control terminal, and being configured to receive a control voltage from the control terminal and supply an output voltage;
an error amplifier circuit configured to supply an amplified signal obtained by amplifying a difference between a voltage based on the output voltage and a reference voltage;
a common source amplifier circuit configured to receive the amplified signal, and to supply the control voltage to the control terminal; and
a non-regulation state detection circuit configured to supply a detection signal including a signal level corresponding to one of a regulation state or a non-regulation state to the common source amplifier circuit,
the common source amplifier circuit including a current control circuit including a plurality of parallel paths each connecting between the control terminal of the output transistor and a first power supply terminal for supplying a first power supply voltage, the parallel paths including a first path to be a closed state in the non-regulation state and a second path to be an opened state in the non-regulation state.

2. The voltage regulator according to claim 1,
wherein the current control circuit includes:
a plurality of current control transistors each provided in one of the plurality of parallel paths, and each including a first terminal connected to the control terminal of the output transistor, a control terminal for receiving the amplified signal, and a second terminal; and
a pass transistor including a first terminal connected to the second terminal of one of the plurality of current control transistors provided in the second path, a second terminal connected to the first power supply terminal, and a control terminal for receiving the detection signal, and being switchable to any one of the opened state or the closed state in accordance with the signal level of the detection signal, and
wherein the pass transistor is switched to the opened state in the non-regulation state.

3. The voltage regulator according to claim 2, wherein the second path includes two or more paths in parallel.

4. The voltage regulator according to claim 2,
wherein the parallel paths include the second path and a third path to be switched to the opened state in the non-regulation state, and
wherein the second terminal of one of the plurality of current control transistors provided in the second path and the second terminal of one of the plurality of current control transistors provided in the third path are connected to each other.

5. The voltage regulator according to claim 1,
wherein the current control circuit further includes a third path to be switched to the opened state in the non-regulation state,
wherein the current control circuit includes:
a plurality of current control transistors each provided in one of the plurality of parallel paths, and each including a first terminal connected to the control terminal of the output transistor, a control terminal for receiving the amplified signal, and a second terminal;

a first pass transistor including a first terminal connected to the second terminal of one of the plurality of current control transistors provided in the second path, a second terminal connected to the first power supply terminal, and a control terminal for receiving the detection signal, and being switchable to any one of the opened state or the closed state in accordance with the signal level of the detection signal; and a second pass transistor including a first terminal connected to the second terminal of one of the plurality of current control transistors provided in the third path, a second terminal connected to the first power supply terminal, and a control terminal for receiving the detection signal, and being switchable to any one of the opened state or the closed state in accordance with the signal level of the detection signal, and wherein the first pass transistor and the second pass transistor are switched to the opened state in the non-regulation state.

6. The voltage regulator according to claim 1, wherein the current control circuit includes:

a plurality of current control transistors connected in parallel between the control terminal of the output transistor and the first power supply terminal, and each including a control terminal for receiving the amplified signal; and a switching circuit configured to switch between, in accordance with the signal level of the detection signal, an opened state in which the control terminal of one of the plurality of current control transistors provided in the second path and the error amplifier circuit are disconnected and a closed state in which the control terminal of the one of the plurality of current control transistors provided in the second path and the error amplifier circuit are connected, and wherein the switching circuit is switched to the opened state in the non-regulation state.

7. The voltage regulator according to claim 6, wherein the switching circuit is configured to switch a connection destination of the control terminal of the one of the plurality of current control transistors provided in the second path, and wherein, in the closed state, the connection destination is switched to the error amplifier circuit, and in the opened state, the connection destination is switched to the first power supply terminal.

8. The voltage regulator according to claim 6, wherein the switching circuit includes:

a first end connected to the error amplifier circuit;

a second end connected to the control terminal of the one of the plurality of current control transistors provided in the second path;

a control end for receiving the detection signal;

a first transistor pair being a pair of a first PMOS transistor and a first NMOS transistor, and including a first end connected to the first end of the switching circuit and a second end connected to the second end of the switching circuit;

a second transistor pair being a pair of a second PMOS transistor and a second NMOS transistor, and including a first end connected to the first power supply terminal and a second end connected to the second end of the switching circuit and the second end of the first transistor pair;

a first inverter for connecting between a gate of the first PMOS transistor and a gate of the first NMOS transistor; and a second inverter for connecting a gate of the second PMOS transistor and a gate of the second NMOS transistor.

9. The voltage regulator according to claim 7, wherein the switching circuit includes:

a first end connected to the error amplifier circuit;

a second end connected to the control terminal of the one of the plurality of current control transistors provided in the second path;

a control end for receiving the detection signal;

a first transistor pair being a pair of a first PMOS transistor and a first NMOS transistor, and including a first end connected to the first end of the switching circuit and a second end connected to the second end of the switching circuit;

a second transistor pair being a pair of a second PMOS transistor and a second NMOS transistor, and including a first end connected to the first power supply terminal and a second end connected to the second end of the switching circuit and the second end of the first transistor pair;

a first inverter for connecting between a gate of the first PMOS transistor and a gate of the first NMOS transistor; and a second inverter for connecting a gate of the second PMOS transistor and a gate of the second NMOS transistor.

10. The voltage regulator according to claim 1, wherein the current control circuit includes a plurality of current control transistors each provided in one of the plurality of parallel paths, and each including a first terminal connected to the control terminal of the output transistor, a control terminal for receiving the amplified signal, and a second terminal, and wherein the common source amplifier circuit includes a current-voltage conversion circuit including a first port connected to a second power supply terminal for supplying a second power supply voltage, and a second port connected to the first terminal of each of the plurality of current control transistors and the control terminal of the output transistor.

11. The voltage regulator according to claim 1, wherein the current control circuit includes a plurality of transistors each provided in one of the plurality of paths connecting between the control terminal of the output transistor and the first power supply terminal in parallel, the plurality of transistors including a first transistor configured to switch between a conductive state and a non-conductive state, the first transistor being the conductive state during the regulation state and the non-conductive state during the non-regulation state, and a second transistor configured to be the conductive state regardless of whether the regulation state or the non-regulation state, wherein the first and the second transistors each contain a first terminal connected to the control terminal of the control transistor, a control terminal for receiving the amplified signal and a second terminal.

12. The voltage regulator according to claim 1, wherein the second path is configured to switch between the opened state and the closed state in accordance with the signal level of the detection signal.

* * * * *